United States Patent
Hunzinger et al.

(10) Patent No.: US 9,208,431 B2
(45) Date of Patent: Dec. 8, 2015

(54) METHOD AND APPARATUS FOR STRATEGIC SYNAPTIC FAILURE AND LEARNING IN SPIKING NEURAL NETWORKS

(75) Inventors: Jason Frank Hunzinger, Escondido, CA (US); Thomas Zheng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 519 days.

(21) Appl. No.: 13/468,331

(22) Filed: May 10, 2012

(65) Prior Publication Data
US 2013/0304681 A1 Nov. 14, 2013

(51) Int. Cl.
G06N 5/00 (2006.01)
G06F 1/00 (2006.01)
G06N 3/08 (2006.01)
G06N 3/04 (2006.01)

(52) U.S. Cl.
CPC . *G06N 3/08* (2013.01); *G06N 3/049* (2013.01)

(58) Field of Classification Search
CPC ........... G06N 3/08; G06N 3/02; G06N 3/049; G06N 3/063
See application file for complete search history.

(56) References Cited

U.S. PATENT DOCUMENTS

| | | | |
|---|---|---|---|
| 6,581,048 B1 | 6/2003 | Werbos | |
| 7,430,546 B1 | 9/2008 | Suri | |
| 7,788,109 B2 | 8/2010 | Jakobson et al. | |
| 7,941,392 B2 | 5/2011 | Saphir | |
| 2008/0147580 A1 | 6/2008 | Pannese | |
| 2010/0057662 A1 | 3/2010 | Collier et al. | |
| 2010/0235310 A1* | 9/2010 | Gage et al. | 706/14 |
| 2010/0312730 A1* | 12/2010 | Weng et al. | 706/15 |
| 2010/0312736 A1 | 12/2010 | Kello | |
| 2012/0011088 A1 | 1/2012 | Aparin et al. | |
| 2012/0259804 A1 | 10/2012 | Brezzo et al. | |
| 2013/0204814 A1 | 8/2013 | Hunzinger et al. | |
| 2013/0204819 A1 | 8/2013 | Hunzinger et al. | |

(Continued)

FOREIGN PATENT DOCUMENTS

| | | |
|---|---|---|
| TW | I345899 B | 7/2011 |
| TW | I352805 B | 11/2011 |
| WO | WO-2012006470 | 1/2012 |

OTHER PUBLICATIONS

Aguirre C. et al., "A Model of Spiking-Bursting Neuronal Behavior Using a Piecewise Linear Two-Dimensional Map", Jun. 18, 2005, Computational Intelligence and Bioinspired Systems, Lecture Notes in Computer Science (LNCS), Springer-Verlag, Berlin/Heidelberg, pp. 130-135, XP019010265, ISBN: 978-3-540-26208-4.

(Continued)

*Primary Examiner* — Jeffrey A Gaffin
*Assistant Examiner* — Kalpana Bharadwaj
(74) *Attorney, Agent, or Firm* — Howard Seo

(57) ABSTRACT

Certain aspects of the present disclosure support a technique for strategic synaptic failure and learning in spiking neural networks. A synaptic weight for a synaptic connection between a pre-synaptic neuron and a post-synaptic neuron can be first determined (e.g., according to a learning rule). Then, one or more failures of the synaptic connection can be determined based on a set of characteristics of the synaptic connection. The one or more failures can be omitted from computation of a neuronal behavior of the post-synaptic neuron.

40 Claims, 8 Drawing Sheets

(56) References Cited

U.S. PATENT DOCUMENTS

| | | |
|---|---|---|
| 2013/0204820 A1 | 8/2013 | Hunzinger et al. |
| 2013/0325765 A1 | 12/2013 | Hunzinger |
| 2013/0325767 A1 | 12/2013 | Hunzinger |
| 2014/0074761 A1 | 3/2014 | Hunzinger |

OTHER PUBLICATIONS

Bamford S.A., et al., "Synaptic rewiring for topographic mapping and receptive field development", Neural Networks, vol. 23, No. 4, Feb. 10, 2010, pp. 517-527, XP055100783, DOI: 10.1016/j.neunet.2010.01.005 Sections 2 and 3.

Buchin A.Y., et al., "Firing-rate model of a population of adaptive neurons", Biophysics, vol. 55, No. 4, Aug. 1, 2010, pp. 592-599, XP055102045, ISSN: 0006-3509, DOI: 10.1134/S0006350910040135 p. 592-p. 599.

Clopath C., et al., "Connectivity reflects coding: a model of voltage-based STDP with homeostasis", Nature Neuroscience, vol. 13, No. 3, Jan. 24, 2010, pp. 344-352, XP055071136, DOI: 10.1038/nn.2479 Discussion Online methods.

Duda A.M., "NeuroXyce synapse device with STDP and stochastic transmission reliability", SAND report from Sandia National Laboratories, 2012, pp. 1-11, XP055100780, Retrieved from the Internet: URL: http://www.alexduda.com/2012_SAND.pdf [retrieved on Feb. 5, 2014] the whole document.

Hunzinger J.F., et al., "Learning complex temporal patterns with resource-dependent spike-timing-dependent plasticity", Journal of Neurophysiology (Articles in PresS), Apr. 11, 2012, pp. 58, XP055100784, DOI: 10.1152/jn.01150.2011 Retrieved from the Internet: URL: http://jn.physiology.org/content/early/2012/04/06/jn.01150.2011.full.pdf [retrieved on Feb. 5, 2012] Resource model.

International Search Report and Written Opinion—PCT/US2013/040358—ISA/EPO—Feb. 17, 2014.

Izhikevich E. M. "Simple model of spiking neurons", IEEE Transactions on Neural Networks, Nov. 1, 2003, vol. 14, No. 6, pp. 1569-1572, IEEE Service Center, Piscataway, NJ, US, XP011105173, ISSN: 1045-9227, DOI: 10.1109/TNN.2003.820440.

Izhikevich E. M., "Which Model to Use for Cortical Spiking Neurons?", IEEE Transactions on Neural Networks, Sep. 1, 2004, vol. 15, No. 5, IEEE Service Center, Piscataway, NJ, US, pp. 1063-1070, XP011118568, ISSN: 1045-9227, DOI: 10.1109/TNN.2004.832719.

Morrison A., et al., "Phenomenological models of synaptic plasticity based on spike timing", Biological Cybernetics, vol. 98, No. 6, Jun. 2008, pp. 459-478, XP019630139, DOI: 10.1007/s00422-008-0233-1 Sections 4 and 5.

Standage D., et al., "Probabilistic, weight-dependent STDP leads torate-dependent synaptic fixed points", Extended abstracts from the 15th annual Computational Neuroscience Meeting (CNS'06), Jul. 18, 2006, pp. 1-3, XP055100782, Retrieved from the Internet: URL:http://neuro.bstu.by/ai/To-dom/My_Research/Papers-2.0/STDP/standage_trappenberg_cns06.pdf [retrieved on Jul. 19, 2011] the whole document.

Tonnelier, A., et al., "Some generalizations of integrate-and-fire models", Scientiae Mathematicae Japonicae Online, vol. 8, No. 14, 2003, pp. 509-516, XP055098449, ISSN: 1346-0447.

Brette et al.,"Simulation of networks of spiking neurons: A review of tools and strategies," Springer, Journal of Computational Neuroscience, vol. 23, pp. 349-398, 2007.

Cessac, et al. "Introducing numerical bounds to improve event-based neural network simulation," arXiv:0810.3992v2 [nlin.AO], last revised Mar. 20, 2009, pp. 1-29.

Ibarz, et al. "Map-based models in neuronal dynamics," Elsevier, Physics Reports 501 (2011), Dec. 16, 2010, pp. 1-74.

Neftci, et al. "Dynamic State and Parameter Estimation applied to Neuromorphic Systems," Institute of Informatics, University of Zurich and ETH Zurich, Zurich CH-8057, Switzerland, pp. 1-30.

Coombes, S., et al., "Nonsmooth dynamics in spiking neuron models," Physica D: Nonlinear Phenomena, vol. 241, issue 22, Nov. 15, 2012, pp. 2042-2057.

Carandini., et al., "Summation and Division by Neurons in Primate Visual Cortex", Science, vol. 264, 1994, pp. 1333-1336.

Melero R C ., "Arquitecturas para el procesamineto de sistemas neuronales parael control de robots bioinspirados", Doctorado de la universidad de Granada, Oct. 8, 2007, XP055103251, Retrieved from the Internet: URL:http://hdl.handle.net/10481/1635 [retrieved on Oct. 26, 2009] Capitulos 3.

Mouraud A.,"Distributed for the event-driven simulation of spiking neural networks approach: application control of saccadic eye movements," The DAMNED Simulator for Implementing a Dynamic Model of the Network Controlling Saccadic Eye Movements, Jun. 29, 2009, XP055103248, Retrieved from internet:http://liris.cnrs.fr/Documents/Liris-4292.pdf p. 2-4.

Naud., et al., "Firing Patterns in the Adaptive Exponential Integrate-and-fire Model", Biol. Cybern, vol. 99, 2008, pp. 335-347.

Neumann M., "Yinspire: A performance efficient simulator for spiking neural nets", Thesis, University of Karlsruhe, May 8, 2008, XP055103254, Retrieved from internet http://www.ntecs.de/projects/documents/yinspirethesis/yinspirethesis.pdf, p. 2, 8, and 10.

Sanchez R R., et al., "Simulacion eficiente de estructuras neuronales basadas en el si sterna nervioso", Doctorado de la universidad de Granada, Jul. 20, 2009, XP055103249, Retrieved from the Internet: URL:http://hdl.handle.net/10481/2404 [retrieved on Dec. 4, 2009] Capitulo 2.

Schaefer., et al., "Coincidence Detection in Pyramidal Neurons is Tuned by their Dendritic Branching Pattern", J. Neurophyiol, vol. 89, 2003, p. 3143-3154.

Scholze S ., et al., "A 32 GBit/s communication SoC for a waferscale neuromorphic system", Integration, The VLSI Journal, vol. 45, No. 1, Jun. 1, 2011, pp. 61-75, XP028324682, DOI: 10.1016/J.VLSI.2011.05.003 Section 3.2.1.

Stewart R D ., et al., "Spiking neural network simulation: memory-optimal synaptic event scheduling", Journal of Computational Neuroscience, vol. 30, No. 3, Nov. 3, 2010, pp. 721-728, XP019912205, DOI: 10.1007/S10827-010-0288-6 Sections 2 and 4.

Taiwan Search Report—TW102116557—TIPO—Nov. 27, 2014.

\* cited by examiner

METHOD AND APPARATUS FOR STRATEGIC SYNAPTIC FAILURE AND LEARNING IN SPIKING NEURAL NETWORKS

BACKGROUND

1. Field

Certain aspects of the present disclosure generally relate to neural system engineering and, more particularly, to a method and apparatus for strategic synaptic failure and learning in spiking neural networks.

2. Background

Learning in spiking neural networks typically involves adjusting a strength (weight) of a synaptic connection based on a learning rule such as the spike-timing-dependent plasticity (STDP). Over time, the synaptic connection strength may therefore change considerably. Moreover, the synaptic strength may be depressed to zero. At first glance, in a software simulation or hardware implementation of a spiking neural network, this should motivate disconnecting the zero-strength synapse to save computation involving an input that will have no effect on the receiving neuron.

However, there are several problems with this approach. First, the capability for structural changes (disconnecting or reusing a synapse for another connection) may be limited. Second, by disconnecting a synapse, the possibility for future learning (increase in strength of the connection) is rendered impossible. For example, even if the synapse strength is zero, the STDP may invoke a future increase in that synapse's strength due to post-synaptic firing. Third, depending on the learning rule and learning context, a portion of weights may converge toward zero but not necessarily reach zero or may reach zero but not stay there or cluster near zero. This presents a further difficulty on how to decide when to disconnect a synaptic connection in order to save computations and yet not to impact learning or network behavior.

The above problems have not yet been solved because either synapses are typically limited in number (and thus have limited capability/potential for learning) or models take longer time to simulate and/or run. For example, in biology, a synaptic failure is typically viewed as simply probabilistic (e.g., equal to a predetermined percentage, such as 40%). The synaptic failure can also occur deterministically if, for example, synaptic vesicles are not replenished with neurotransmitter. The present disclosure provides solutions to the aforementioned problems.

SUMMARY

Certain aspects of the present disclosure provide a method of neural learning in a neural network. The method generally includes determining a synaptic weight for a synaptic connection between a pre-synaptic neuron and a post-synaptic neuron, determining one or more failures of the synaptic connection based on a set of characteristics of the synaptic connection, and omitting the one or more failures from computation of a neuronal behavior of the post-synaptic neuron.

Certain aspects of the present disclosure provide an apparatus for neural learning in a neural network. The apparatus generally includes a first circuit configured to determine a synaptic weight for a synaptic connection between a pre-synaptic neuron and a post-synaptic neuron, a second circuit configured to determine one or more failures of the synaptic connection based on a set of characteristics of the synaptic connection, a third circuit configured to omit the one or more failures from computation of a neuronal behavior of the post-synaptic neuron, and a fourth circuit configured to adjust changes of the synaptic weight for successful transmissions of events to the post-synaptic neuron via the synaptic connection depending on a probability of the one or more failures.

Certain aspects of the present disclosure provide an apparatus for neural learning in a neural network. The apparatus generally includes means for determining a synaptic weight for a synaptic connection between a pre-synaptic neuron and a post-synaptic neuron, means for determining one or more failures of the synaptic connection based on a set of characteristics of the synaptic connection, means for omitting the one or more failures from computation of a neuronal behavior of the post-synaptic neuron, and means for adjusting changes of the synaptic weight for successful transmissions of events to the post-synaptic neuron via the synaptic connection depending on a probability of the one or more failures.

Certain aspects of the present disclosure provide a computer program product for neural learning in a neural network. The computer program product generally includes a computer-readable medium comprising code for determining a synaptic weight for a synaptic connection between a pre-synaptic neuron and a post-synaptic neuron, determining one or more failures of the synaptic connection based on a set of characteristics of the synaptic connection, and omitting the one or more failures from computation of a neuronal behavior of the post-synaptic neuron.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
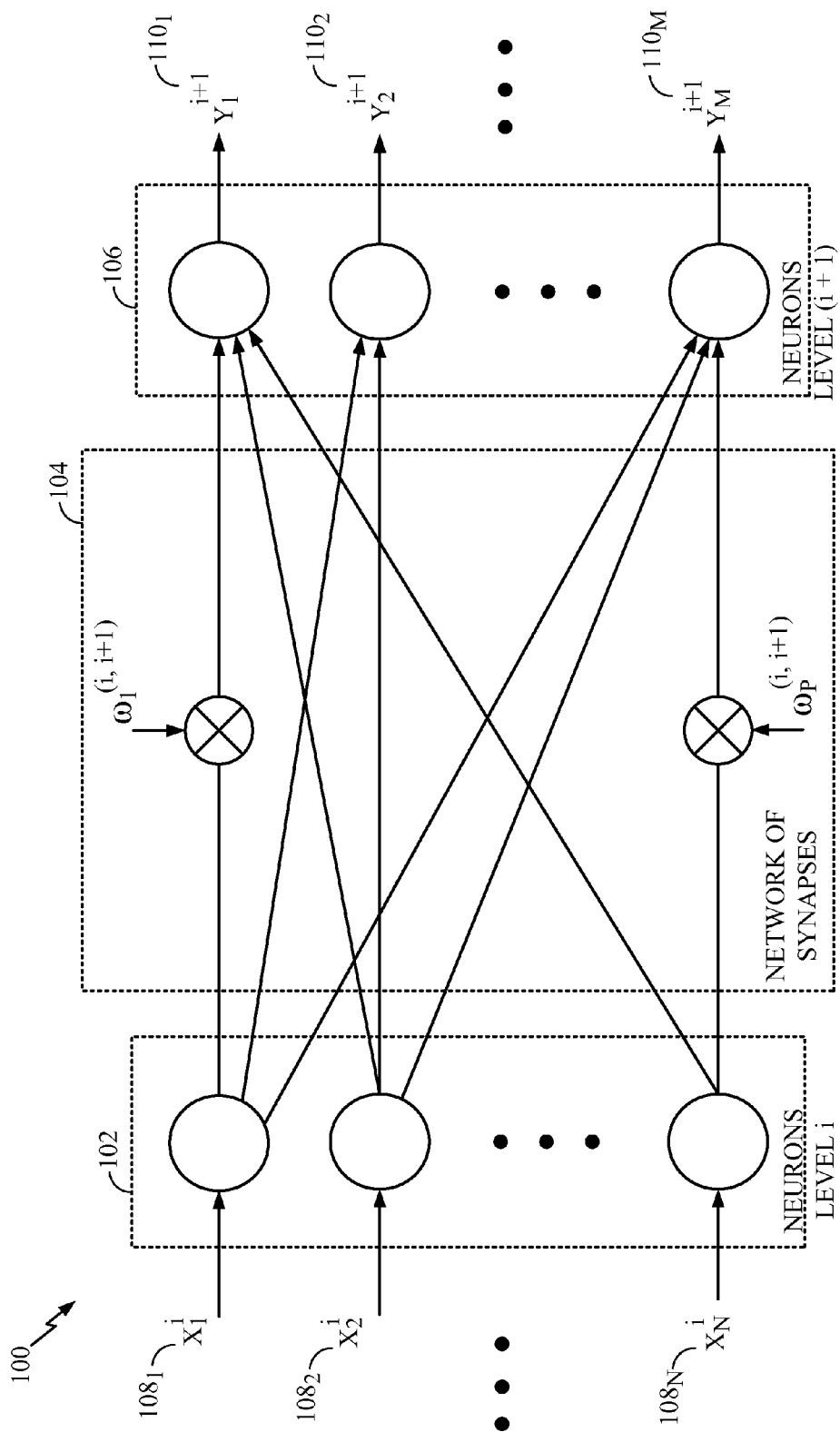
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104. For simplicity, only two levels of neurons are illustrated in FIG. 1, although fewer or more levels of neurons may exist in a typical neural system.

As illustrated in FIG. 1, each neuron in the level 102 may receive an input signal 108 that may be generated by a plurality of neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106).

The transfer of spikes from one level of neurons to another may be achieved through the network of synaptic connections (or simply "synapses") 104, as illustrated in FIG. 1. The synapses 104 may receive output signals (i.e., spikes) from the level 102 neurons (pre-synaptic neurons relative to the synapses 104), and scale those signals according to adjustable synaptic weights $w_1^{(i,i+1)}, \ldots, w_P^{(i,i+1)}$ (where P is a total number of synaptic connections between the neurons of levels 102 and 106). Further, the scaled signals may be combined as an input signal of each neuron in the level 106 (post-synaptic neurons relative to the synapses 104). Every neuron in the level 106 may generate output spikes 110 based on the corresponding combined input signal. The output spikes 110 may be then transferred to another level of neurons using another network of synaptic connections (not shown in FIG. 1).

The neural system 100 may be emulated by an electrical circuit and utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Figure 2A:
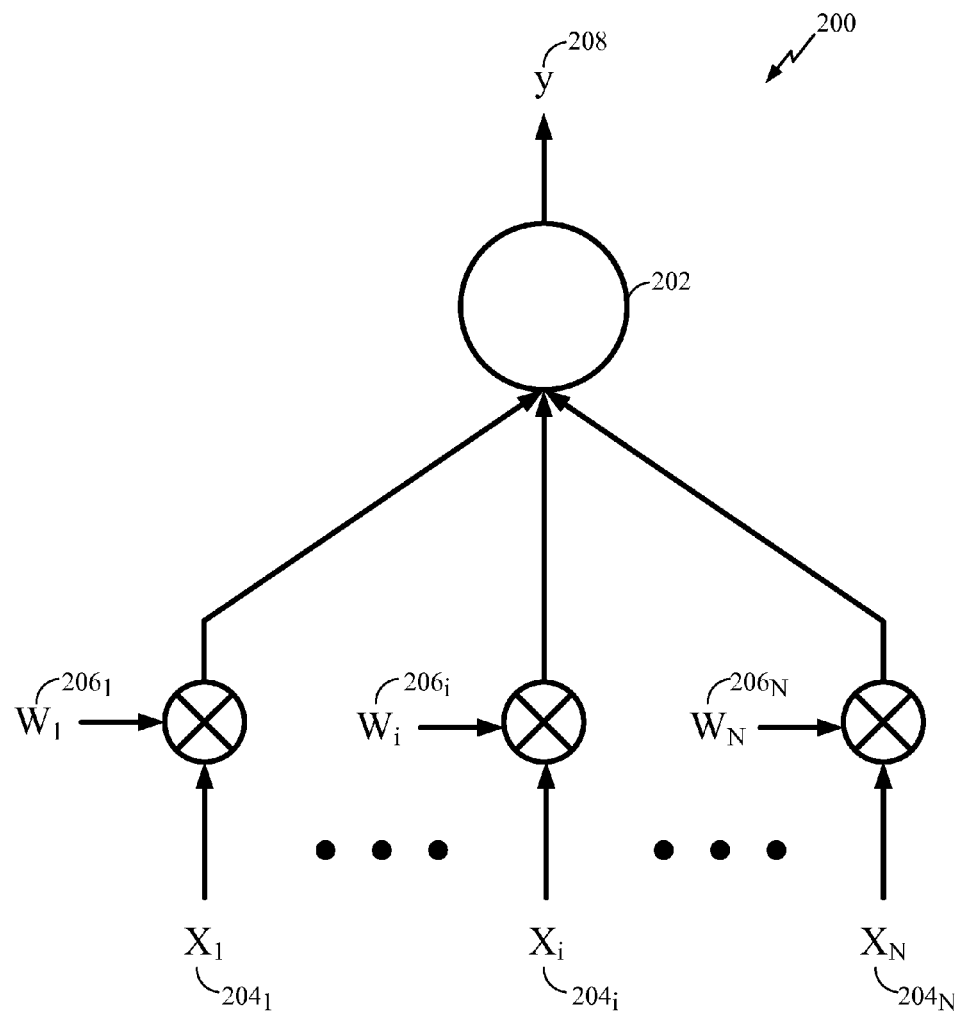
FIGS. 2A-2B illustrate examples of a processing unit (neuron) of a computational network (neural system or neural network) in accordance with certain aspects of the present disclosure.

FIG. 2A illustrates an example 200 of a processing unit (e.g., a neuron) 202 of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$ ($x_1$-$x_N$), which may be signals external to the neural system, or signals generated by other neurons of the same neural system, or both. The input signal may be a current or a voltage, real-valued or complex-valued. The input signal may comprise a numerical value with a fixed-point or a floating-point representation. These input signals may be delivered to the neuron 202 through synaptic connections that scale the signals according to adjustable synaptic weights $206_1$-$206_N$ ($w_1$-$w_N$), where N may be a total number of input connections of the neuron 202.

The neuron 202 may combine the scaled input signals and use the combined scaled inputs to generate an output signal 208 (i.e., a signal y). The output signal 208 may be a current, or a voltage, real-valued or complex-valued. The output signal may comprise a numerical value with a fixed-point or a floating-point representation. The output signal 208 may be then transferred as an input signal to other neurons of the same neural system, or as an input signal to the same neuron 202, or as an output of the neural system.

The processing unit (neuron) 202 may be emulated by an electrical circuit, and its input and output connections may be emulated by wires with synaptic circuits. The processing unit 202, its input and output connections may also be emulated by a software code. The processing unit 202 may also be emulated by an electric circuit, whereas its input and output connections may be emulated by a software code. In one aspect of the present disclosure, the processing unit 202 in the computational network may comprise an analog electrical circuit. In another aspect, the processing unit 202 may comprise a digital electrical circuit. In yet another aspect, the processing unit 202 may comprise a mixed-signal electrical circuit with both analog and digital components. The computational network may comprise processing units in any of the aforementioned forms. The computational network (neural system or neural network) using such processing units may be utilized in a large range of applications, such as image and pattern recognition, machine learning, motor control, and alike.

During the course of training of neural network, synaptic weights (e.g., the weights $w_1^{(i,i+1)}, \ldots, w_P^{(i,i+1)}$ from FIG. 1 and/or the weights $206_1$-$206_N$ from FIG. 2A) may be initialized with random values and changed in small increments according to a learning rule. Some examples of the learning rule are the spike-timing-dependent plasticity (STDP) learning rule, the Hebb rule, the Oja rule, the Bienenstock-Copper-Munro (BCM) rule, etc.

In the present disclosure, a synapse (e.g., any of the synapses 104 from FIG. 1, or any of synapse connections from FIG. 2A associated with the weights $206_1$-$206_N$) may fail depending on a synaptic weight of that synapse. In the preferred embodiment, when a synapse's weight (e.g., any of the weights $w_1^{(i,i+1)}, \ldots, w_P^{(i,i+1)}$ from FIG. 1 and/or any of the weights $206_1$-$206_N$ from FIG. 2A) is within a particular range, the synapse associated with that weight has a chance to fail.

Figure 2B:
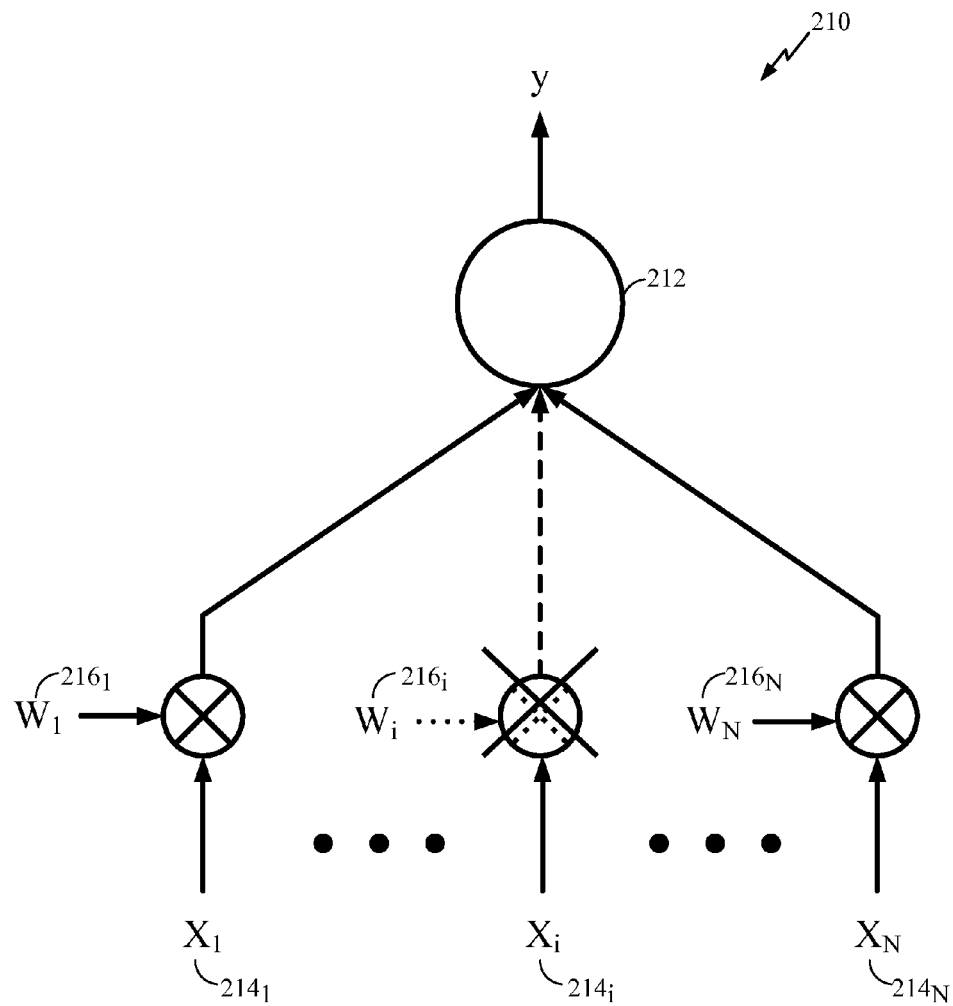

As illustrated in an example 210 in FIG. 2B, a synapse connection associated with a weight $216_i$ may fail. The failure means that the synapse does not transmit an event to a post-synaptic neuron (e.g., an event from an input or a pre-synaptic neuron $214_i$ to a post-synaptic neuron 212 in FIG. 2B). This is in contrast to success where the synapse transmits an event to the post-synaptic neuron with the associated weight. Moreover, the chance to fail may increase as the weight decreases. To compensate for a reduced chance of learning, an adjustment to the learning mechanism may need also to be applied. The learning adjustment also depends on the synaptic weight or chance of synaptic failure. In the preferred embodiment, this means that the adjustment has a larger effect when a synaptic weight is smaller because failure chance is larger.

Advantages of the synapse learning method described in the present disclosure comprise improving learning in spiking neural networks by being able to include more synapses while reducing computational requirements. In addition, while the advantages are present for discrete-time and continuous-time/event-based methods of modeling, the advantages may be even greater for event-based methods.

Neural Learning and Change of Synaptic Weight

Learning in spiking neural networks, such as the neural network 100 from FIG. 1, may typically involve adjusting strength (weight) of a synaptic connection based on a learning rule such as the STDP. The typical STDP learning rule may effectively adapt a synaptic weight of a synapse connecting a neuron A (e.g., a pre-synaptic neuron) to a neuron B (e.g., a post-synaptic neuron) as a function of time difference between the pre-synaptic neuron A's spike time $t_{pre}$ and the post-synaptic neuron B's spike time $t_{post}$ (i.e., $\Delta t = t_{post} - t_{pre}$). A typical formulation of the STDP rule is to increase the synaptic weight (i.e., potentiate the synapse) if the time difference is positive (the pre-synaptic neuron fires before the post-synaptic neuron), and decrease the synaptic weight (i.e., depress the synapse) if the time difference is negative (the post-synaptic neuron fires before the pre-synaptic neuron). A change of the synaptic weight may be typically achieved using an exponential decay, as given by:

$$\Delta w = A_{sign(\Delta t)} \cdot e^{-|\Delta t|/\tau_{sign(\Delta t)}}, \quad (1)$$

where $\tau_{sign(\Delta t)}$ is a time constant and $A_{sign(\Delta t)}$ is a scaling magnitude, wherein both $\tau_{sign(\Delta t)}$ and $A_{sign(\Delta t)}$ may typically depend on whether the time difference is positive or negative. It should be evident that the weight may be increased for causal inputs (positive time difference) regardless of how large the difference is (within the order of the time constant). Similarly, the opposite may occur for non-causal inputs.

According to the STDP learning rule, a synaptic weight may reach zero. If the synaptic weight is zero, then inputs via that synapse may have no effect on the static behavior of the post-synaptic neuron. Thus, at first glance, it may appear advantageous to disconnect the synapse in order to save computations. However, there are several problems with this approach. First, the capability for structural changes (e.g., disconnecting or reusing a synapse for another connection) may be limited in a neuromorphic hardware implementation or software simulation.

Second, by disconnecting a synapse, the possibility for future learning (increase in strength of the connection) is rendered impossible. For example, even if synapse strength is zero, the STDP rule may invoke a future increase in that synapse's strength due to post-synaptic firing. This can be observed from the nature of equation (1). The weight change $\Delta w$ may be non-zero even if the weight is zero because the weight change does not depend on the current weight.

Weight changes can be applied in two typical ways. In one aspect, additive weight changes may be typically applied as follows, $$w = w + \Delta w. \quad (2)$$

In this case, a weight that is zero may become non-zero.

In another aspect, multiplicative weight changes may be typically applied as follows, $$w = w(1 + \alpha \Delta w). \quad (3)$$

In this case, at first glance, it may appear that there is no problem because once a weight reaches zero it remains at zero. However, for the same reason as before, a weight will be unlikely to ever reach zero in the multiplicative model. This problem is different but also applicable because if weights do not reach zero how can computation be saved. This problem of non-zero small weights will be discussed further below.

More complex ways of applying weight changes may comprise slow leaking of weight changes, where the weight change amount is leaked into the weight slowly and the weight change itself evolves, e.g., by Infinite Impulse Response (IIR):

$$w = w + \alpha \Delta w; \Delta w = \beta \Delta w. \quad (4)$$

Although more complex (sophisticated), this approach may have the same problems as above: either this method tends to prevent weights from reaching zero or the zero weights can become non-zero by learning.

In yet another aspect, a method of weight change may comprise determining the weight change amount $\Delta w$ depending on the current weight $w$. Models based on this approach have been proposed in the prior art, but biological evidence in support of these models is limited. More importantly, such models still have the above problems: either weights cannot or are unlikely to reach zero, or weights that become zero can again become non-zero.

A third problem with the approach of disconnecting the synapse to save computations is that, depending on the learning rule and learning context, a portion of weights may converge toward zero but not necessarily reach zero or may reach zero but not stay there or cluster near zero. This may present a further difficulty on how to decide when to disconnect a synapse connection in order to save computations. If a weight is not zero, it can influence the post-synaptic behavior and thus removal of the connection may impact the neural network behavior.

Therefore, a method of reducing computations in a spiking neural network that does not negatively affect learning is desired. Certain aspects of the present disclosure support synaptic failure or learning adjustment depending on one or more synaptic characteristics. In the preferred embodiment, the synaptic characteristics comprise a synaptic weight. In general, the synaptic characteristics may comprise at least one of synapse weight, delay, state, location, connectivity, or age. Furthermore, the synaptic failure may be probabilistic when a synaptic characteristic is within a predefined range. In addition, the learning adjustment may compensate for synaptic failure. Beside computational benefits that may be achieved by employing the probabilistic synaptic failure, another motivation for implementing the synaptic failure as probabilistic is to improve robustness of the learning. It can be shown that the probabilistic synaptic failure may actually improve performance after learning (e.g., in learning visual receptive fields). One way to explain this is that causing synapses to artificially fail emulates a response to a noisy training signal.

Synaptic Failure

According to the preferred embodiment of the present disclosure, a synapse may become active when a pre-synaptic spike reaches the synapse. Then, the synapse may fail or succeed. This binary decision may depend on one or more synapse characteristics. Generally, the decision may be subdivided according to the context; for example, according to the range of the synapse characteristics.

In an aspect of the present disclosure, a synapse weight (strength) may be an example of the synapse characteristics and, without loss of generality, the maximum weight may be equal to one. For example, three ranges of weight defined by $[0, f_{min}], [f_{min}, f_{max}], [f_{max}, 1]$ can be considered. If the synapse weight is within the first range, then the synaptic failure may be determined to be high (or it may always happen). If the synapse weight is within the third range, then the synaptic failure may be determined to be low (or it may never happen). If the synapse weight is within the second range, then the synaptic failure may be probabilistic. In an aspect, the synaptic failure may be determined randomly with some probability P(failure).

Moreover, the probability of synaptic failure may be dependent on synaptic characteristic(s), such as the synaptic weight, i.e., $$P(\text{failure}) = \max\left(0, 1 - \frac{\max(0, w - f_{min})}{f_{max} - f_{min}}\right), \quad (5)$$

so that the chance of failure may decrease as the weight increases. In this exemplary case, there are up to three ranges with the probability of failure linearly dependent on the weight in the middle range. However, variations on the number of ranges (whether predetermined or dynamic) and the mathematical relationship between the characteristic and the failure probability can also be used in the present disclosure.

Whether a failure actually occurs or not for any given synaptic event may be computed in various ways such as by determining a random number and comparing against the probability of failure. A pseudo-code for the probabilistic synaptic failure based on the determination of the random number may be given as:

```
bool failure(double w)
{
    if(w <= f_min) return(false);
    else if(w >= f_max) return(true);
    else { return((w - f_min)<(f_max-f_min)*
        random_double_between_0_and_1( ));}
}
```

In an event-based simulator, a synaptic failure may mean that an event does not have to be scheduled for the post-synaptic neuron to receive a synaptic input. This may save computations in terms of insertion into the event schedule, event processing, and indirect computations involving schedule manipulation (e.g., sorting, insertion of other events, and so on). In a discrete-time based simulator, a synaptic failure may have less computational benefit, but computations in the event processing can still be saved. Additional benefits of the simulated synaptic failure may comprise more robust learning and improved neural performance.

Synaptic Failure as Function of Time

A probabilistic synaptic failure can be achieved by computing a pseudo-random number using typical computation methods. However, success or failure may also be determined deterministically to have a particular probability. For example, success may be determined to occur with a particular period N, i.e., a synapse may fail except every N-th activation. In another example, success may be determined to occur if activation occurs at a particular interval. For example, if a synapse is activated within time T of a prior successful activation, then it fails; otherwise the synapse succeeds. Moreover, the probability of activation may be defined as being dependent on a time since the last successful activation.

If an Inter-Event-Interval (IEI) $\Delta t$ is modeled by a distribution $P(\Delta t)$, this Probability Density Function (PDF) may be used to determine the probability of failures. The principle is that the rarer the synaptic event, determined by $(\Delta t)$, the less likely the synapse would fail. More specifically, $$P_f(\Delta t) = P(\Delta t). \quad (6)$$

In this implementation, it can be assumed that all spiking events are independent. However, it may be justified to impose a condition that the cumulative events $\Delta t_i$, $i=1, \ldots, K$ are to be taken into account when computing the probability of synaptic failure, where K is a total number of previous synaptic failures. More specifically, $$P_f(\Delta t_i, i=1, \ldots, K) = P(g(\Delta t_i, i=1, \ldots, K)). \quad (7)$$

A typical g function may be defined as:

$$g(\Delta t_i, i=1, \ldots, K) = \Sigma_{i=1}^{K} w_i \Delta t_i. \quad (8)$$

For example, assuming $$P(\Delta t) = \frac{1}{\beta} e^{-\frac{\Delta t}{\beta}},$$

i.e. an exponential distribution, $g(\Delta t_i, i=1, \ldots, K) = \Sigma_{i=1}^{K} \Delta t_i$ may be used as the aggregate function for K cumulative $\Delta t_i$, $i=1, \ldots, K$ since a last successful synaptic event. For an exponential distribution, the only parameter to be estimated is the scale parameter $\beta$. The maximum likelihood estimate for $\beta$ may be given as:

$$\hat{\beta} = \frac{1}{K}\sum_{i=1}^{K}\Delta t_i. \quad (9)$$

Therefore, a closed form expression for the probability of failures may be given as:

$$P_f\left(\sum_{i=1}^{K}\Delta t_i\right) = \frac{1}{\hat{\beta}}e^{-\frac{\sum_{i=1}^{K}\Delta t_i}{\hat{\beta}}}. \quad (10)$$

In addition to the synaptic failures, it may be needed to compensate the weight adjustment for the failed synapses by accumulating the weights, i.e., $$\hat{w} = \sum_{i=1}^{K} f(w_i). \quad (11)$$

In most cases, $f(w_i)=w_i$. But, in some neural networks, the weight value may have a decayed time value such as the γ-amino-butyric acid (GABA) inhibitory current. Therefore, in this case, $$f(w_i) = w_i e^{-\frac{\Delta t_i}{\tau}},$$

where τ is a time constant for a post-synaptic current.

Learning Adjustment

According to certain aspects of the present disclosure, two forms of learning adjustment may be made due to the possibility of synaptic failure. The spike-timing-dependent plasticity (STDP) learning rules may typically need a memory of time occurrence of at least one pre-synaptic spike and one post-synaptic spike. First, the case is considered where, if a synapse failure occurs, there is no knowledge of the pre-synaptic spike from the point of view of the learning rule (i.e., from the post-synaptic or synapse local viewpoint). In this case, there is no knowledge to trigger spike-timing-dependent plasticity changes to the synapse based on the failed event (i.e., there is no knowledge of the event).

Adjustment in Successful Synaptic Events

The first form of learning adjustment may take this problem into account by adjusting learning that occurs when the synapse does not fail. First, it can be recognized that the synapse may fail or may succeed. Since knowledge of the event is available only when it succeeds, it may be assumed that conditions would be similar in failure cases. Thus, missing the failures may be compensated by adjusting the weight change in successful cases. For example, in an aspect, the weight change may be boost by the probability of failure, i.e., $$\Delta w = P(\text{failure}) A_{sign(\Delta t)} e^{-|\Delta t|/\tau_{sign(\Delta t)}}. \quad (12)$$

Therefore, when the synapse does not fail, the weight change may be larger than nominal in order to account for the fact that no adjustment was made for synaptic failure cases.

In another aspect, the weight may be adjusted by a more general function of the failure probability or history of failure probability (because the failure probability may be changing), i.e., $$\Delta w = f(\{P(\text{failure})\}) A_{sign(\Delta t)} e^{-|\Delta t|/\tau_{sign(\Delta t)}}. \quad (13)$$

In yet another aspect, the synaptic learning (synapse weight) may be adjusted based on the synaptic characteristic or history thereof, i.e., $$\Delta w = f(\{w(t)\}) A_{sign(\Delta t)} e^{-|\Delta t|/\tau_{sign(\Delta t)}}. \quad (14)$$

In the preferred embodiment, the adjustment to the weight change may be smaller when the weight is larger in order to reflect that the probability of failure is smaller for a larger weight. For example, if the weight is within the failure range, then $$\Delta w = \left(\frac{f_{max} - f_{min}}{w - f_{min}}\right) A_{sign(\Delta t)} e^{-|\Delta t|/\tau_{sign(\Delta t)}}. \quad (15)$$

An equivalent way to achieve the weight adjustment effect can be to change the STDP learning curve or make long-term potentiation (LTP) and long-term depression (LTD) curves dependent on current synaptic weight.

Learning when Synaptic Failures Occur

Another way to account for synaptic failures in learning can be to apply learning even to synapses that fail. This means that while synaptic failures do not result in an event to process, they may result in learning. The idea is to separate accounting of synaptic failures from potential synaptic events. If it is accounted for in all potential synaptic events, for example by knowing the pre-synaptic event time, learning can be applied to a synapse even when the synapse fails. Technically, this alternative comprises executing a synaptic update rule for synaptic events whether they fail or succeed. Moreover, this synaptic learning rule may be executed at a different time than the synaptic update rule would have been executed had the synapse not failed. This is possible because there is no impact on the immediate behavior of the post-synaptic neuron.

A typical method of implementing STDP may comprise (a) executing LTP or weight increases when a post-synaptic event occurs (and changing the weight depending on the time since the last pre-synaptic event); and (b) executing LTD or weight decreases when a pre-synaptic event occurs (and changing the weight depending on the time since the last post-synaptic event). In this case, in order to implement the disclosed alternative described above, the method may comprise: (a) recording the time of pre-synaptic events (whether they result in synaptic failure or not) and using this time in the LTP post-synaptic rule; and (b) executing the LTD pre-synaptic rule regardless of whether or not a synaptic failure occurs.

Figure 3:
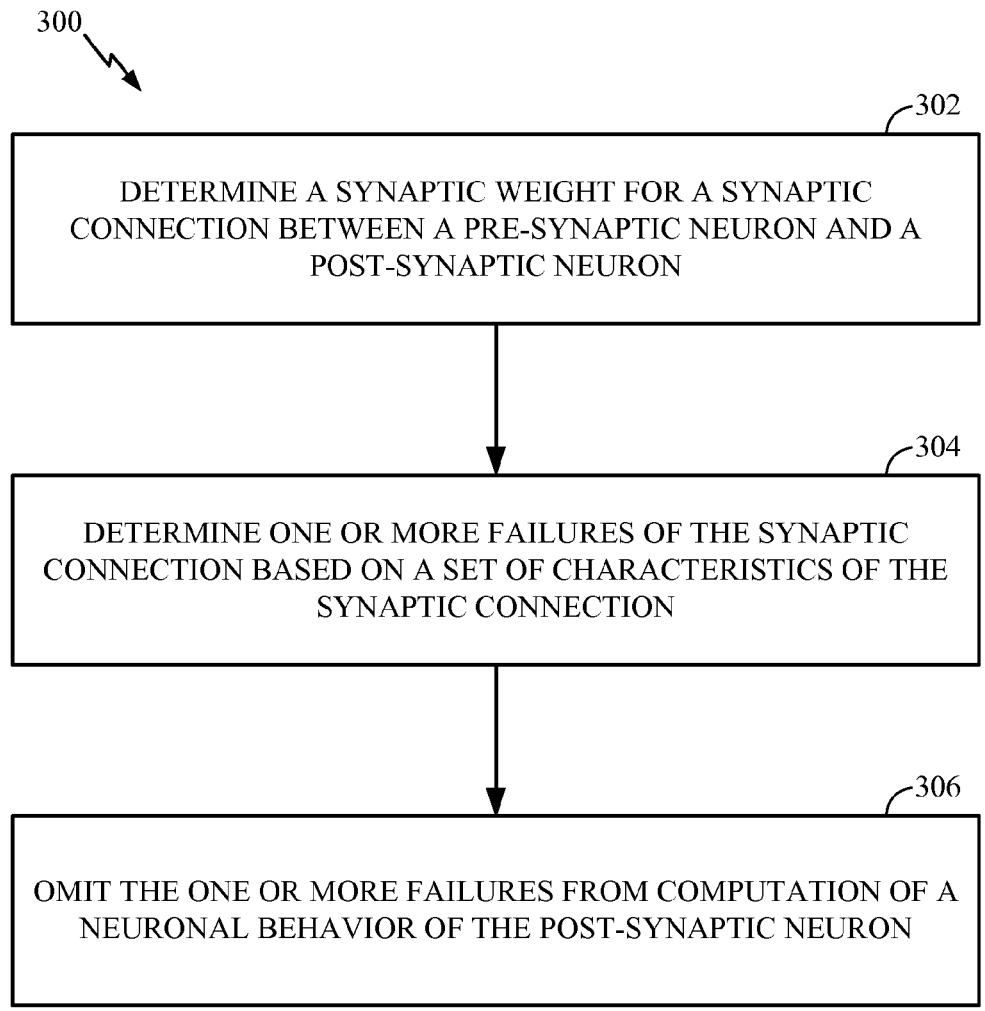
FIG. 3 illustrates example operations of neural learning in a neural network in accordance with certain aspects of the present disclosure.

FIG. 3 illustrates example operations 300 of neural learning in a neural network (e.g., the neural network 100 from FIG. 1) in accordance with certain aspects of the present disclosure. At 302, a synaptic weight (e.g., any of the weights $206_1$-$206_N$ from FIG. 2A) may be determined for a synaptic connection between a pre-synaptic neuron and a post-synaptic neuron. At 304, one or more failures of the synaptic connection may be determined based on a set of characteristics of the synaptic connection. At 306, the one or more failures may be omitted from computation of a neuronal behavior of the post-synaptic neuron.

According to certain aspects of the present disclosure, determining the one or more failures of the synaptic connection may comprise determining the one or more failures that are probabilistic. A probability of each of the one or more failures may depend on one or more synaptic characteristics from the set. In an aspect, the synaptic weight may be determined according to a learning rule, e.g., the STDP rule, the Hebb rule, the Oja rule, or the BCM rule. Furthermore, one or more effects of the one or more failures may be included in learning of the synaptic weight, wherein the learning of the synaptic weight may be executed at a different time than updating of the synaptic weight would have been executed had the synaptic connection not failed. In one aspect, including the one or more effects of the one or more failures in learning may comprise adjusting changes of the synaptic weight for successful transmissions of events to the post-synaptic neuron via the synaptic connection depending on a probability of the one or more failures. In another aspect, including the one or more effects of the one or more failures in learning may comprise determining changes of the synaptic weight for the one or more failures and for one or more successful transmissions of events to the post-synaptic neuron via the synaptic connection.

In an aspect of the present disclosure, the set of characteristics of the synaptic connection may comprise at least one of: the synaptic weight, a delay of the synaptic connection, an age of the synaptic connection, location of the synaptic connection, a size of the synaptic connection, a state of the synaptic connection, a time period since last activation of the synaptic connection, a time period since last successful activation or failed activation of the synaptic connection, a state of the pre-synaptic neuron, or a state of the post-synaptic neuron. In an aspect of the present disclosure, a chance of the failures or successful transmissions of events via the synaptic connection may not affect an amount of an input to the post-synaptic neuron, if a transmission of an event via the synaptic connection is success, and the amount of the input may be zero, if the transmission of the event via the synaptic connection fails. In an aspect, a probability of the one or more failures may be a function of a synaptic connectivity in the neural network (i.e., a hardware load).

Figure 4:
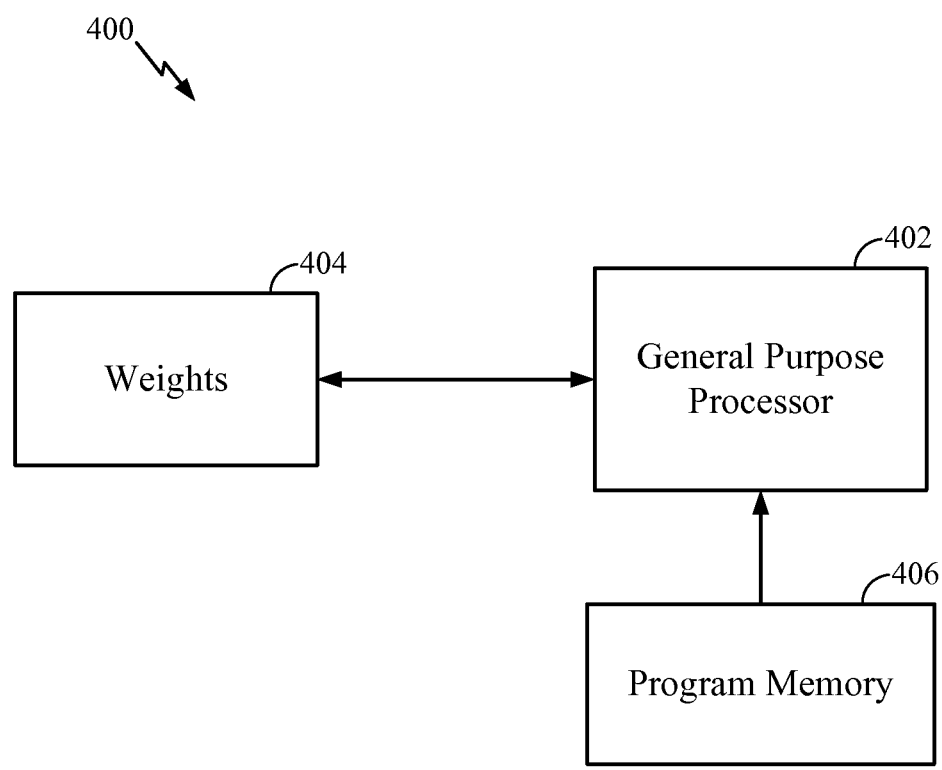
FIG. 4 illustrates an example software implementation of neural learning using a general-purpose processor in accordance with certain aspects of the present disclosure.

FIG. 4 illustrates an example software implementation 400 of the aforementioned method for neural learning using a general-purpose processor 402 in accordance with certain aspects of the present disclosure. Weights associated with each connection (synapse) of a computational network (neural network) may be stored in a memory block 404, while instructions related to the neural learning being executed at the general-purpose processor 402 may be loaded from a program memory 406. In an aspect of the present disclosure, the instructions loaded into the general-purpose processor 402 may comprise code for determining a synaptic weight for a synaptic connection between a pre-synaptic neuron and a post-synaptic neuron, code for determining one or more failures of the synaptic connection based on a set of characteristics of the synaptic connection, and code for omitting the one or more failures from computation of a neuronal behavior of the post-synaptic neuron.

Figure 5:
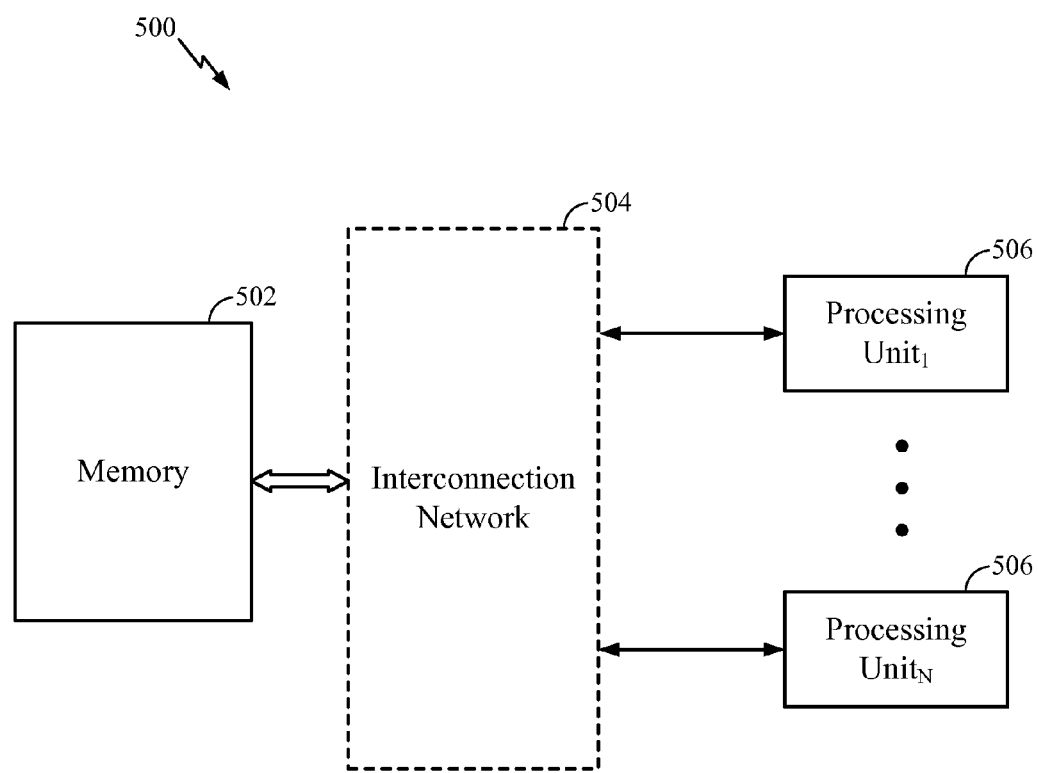
FIG. 5 illustrates an example implementation of neural learning where a memory may be interfaced with individual distributed processing units in accordance with certain aspects of the present disclosure.

FIG. 5 illustrates an example implementation 500 of the aforementioned method for neural learning where a memory 502 can be interfaced via an interconnection network 504 with individual (distributed) processing units (neural processors) 506 of a computational network (neural network) in accordance with certain aspects of the present disclosure. One or more weights associated with one or more connections (synapses) of the computational network (neural network) may be loaded from the memory 502 via connection(s) of the interconnection network 504 into each processing unit (neural processor) 506. In an aspect of the present disclosure, the processing unit 506 may be configured to determine a synaptic weight for a synaptic connection between a pre-synaptic neuron and a post-synaptic neuron, determine one or more failures of the synaptic connection based on a set of characteristics of the synaptic connection, and omit the one or more failures from computation of a neuronal behavior of the post-synaptic neuron.

Figure 6:
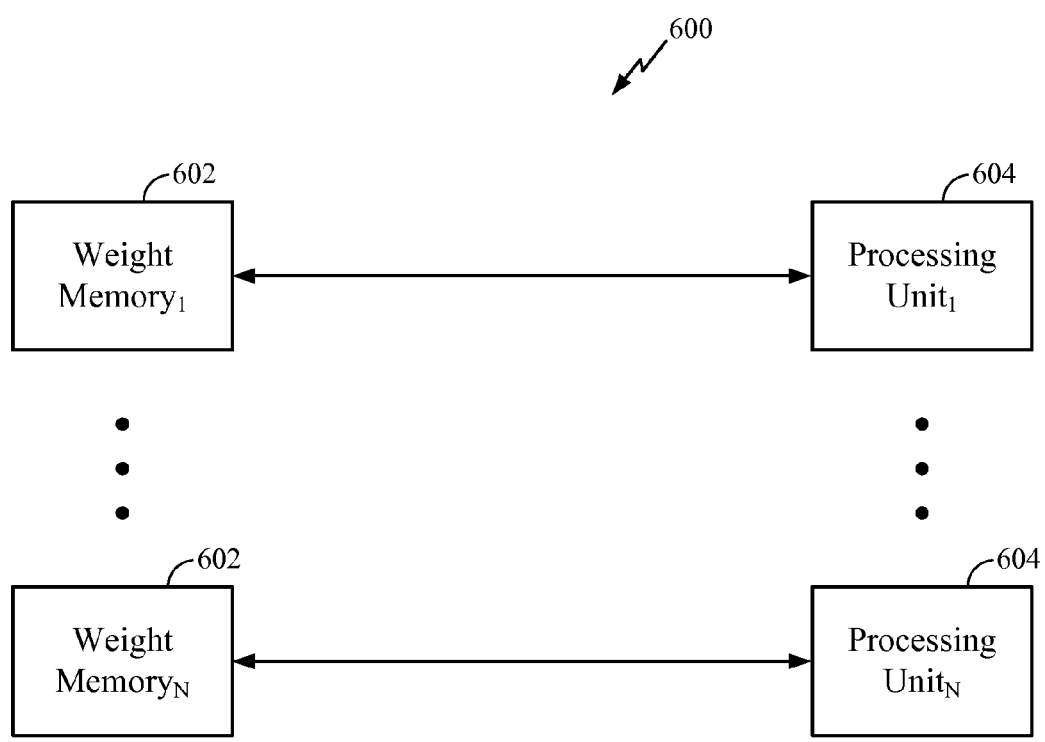
FIG. 6 illustrates an example implementation of neural learning based on distributed memories and distributed processing units in accordance with certain aspects of the present disclosure.

FIG. 6 illustrates an example implementation 600 of the aforementioned method for neural learning based on distributed weight memories 602 and distributed processing units (neural processors) 604 in accordance with certain aspects of the present disclosure. As illustrated in FIG. 6, one memory bank 602 may be directly interfaced with one processing unit 604 of a computational network (neural network), wherein that memory bank 602 may store one or more weights of one or more connections (synapses) associated with that processing unit (neural processor) 604. In an aspect of the present disclosure, the processing unit 604 may be configured to determine a synaptic weight for a synaptic connection between a pre-synaptic neuron and a post-synaptic neuron, determine one or more failures of the synaptic connection based on a set of characteristics of the synaptic connection, and omit the one or more failures from computation of a neuronal behavior of the post-synaptic neuron.

Figure 3A:
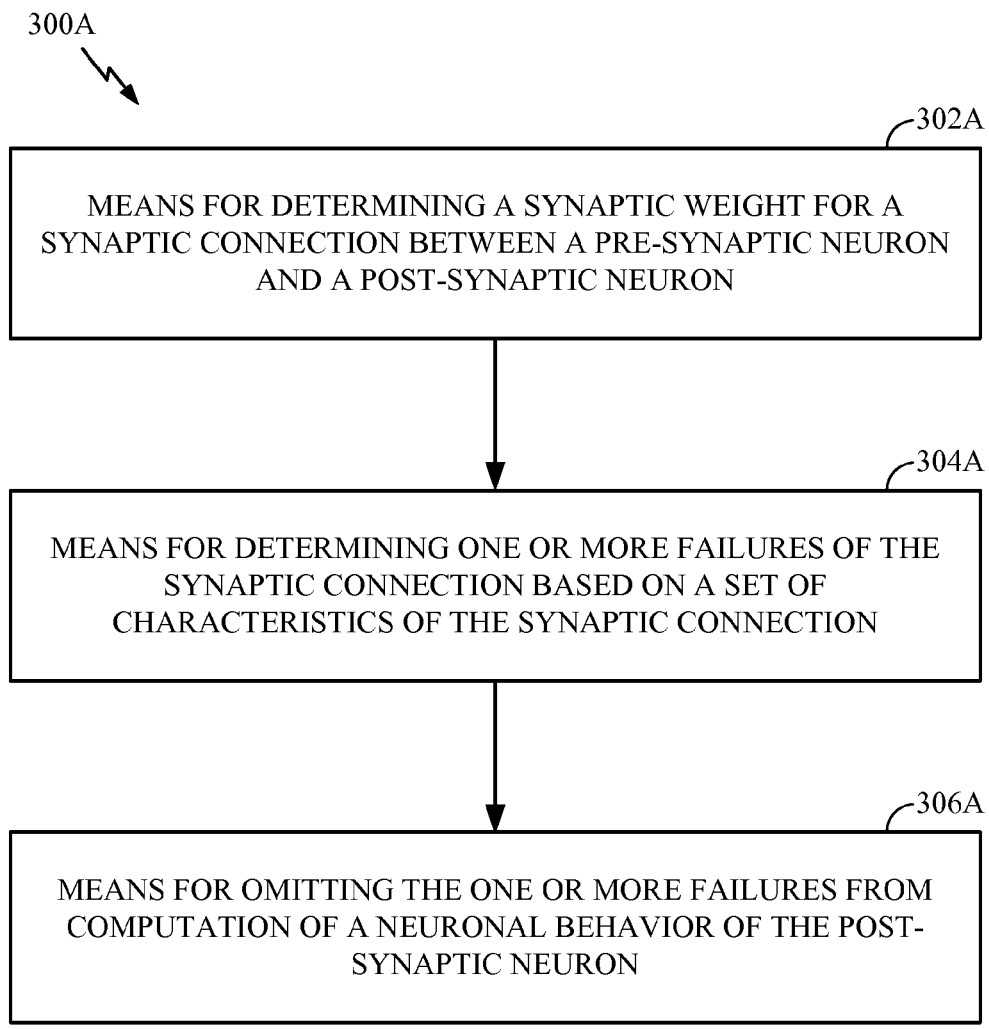
FIG. 3A illustrates example components capable of performing the operations illustrated in FIG. 3.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 300 illustrated in FIG. 3 correspond to components 300A illustrated in FIG. 3A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method of neural learning in a neural network, comprising:
    determining a synaptic weight for a synaptic connection between a pre-synaptic neuron and a post-synaptic neuron;
    determining one or more failures of the synaptic connection based on a set of characteristics of the synaptic connection, wherein the set of characteristics comprises the synaptic weight;
    omitting the one or more failures from computation of a neuronal behavior of the post-synaptic neuron; and
    including one or more effects of the one or more failures in learning of the synaptic weight.

2. The method of claim 1, wherein determining the one or more failures of the synaptic connection comprises determining the one or more failures that are probabilistic.

3. The method of claim 2, wherein a probability of each of the one or more failures depends on one or more synaptic characteristics from the set.

4. The method of claim 1, wherein determining the synaptic weight is performed according to a learning rule.

5. The method of claim 1, wherein the learning of the synaptic weight is executed at a different time than updating of the synaptic weight would have been executed had the synaptic connection not failed.

6. The method of claim 1, wherein including the one or more effects of the one or more failures in learning comprises:
    adjusting changes of the synaptic weight for successful transmissions of events to the post-synaptic neuron via the synaptic connection depending on a probability of the one or more failures.

7. The method of claim 1, wherein including the one or more effects of the one or more failures in learning comprises:
    determining changes of the synaptic weight for the one or more failures and for one or more successful transmissions of events to the post-synaptic neuron via the synaptic connection.

8. The method of claim 1, wherein the set of characteristics of the synaptic connection further comprises at least one of: a delay of the synaptic connection, an age of the synaptic connection, location of the synaptic connection, a size of the synaptic connection, a state of the synaptic connection, a time period since last activation of the synaptic connection, a time period since last successful activation or failed activation of the synaptic connection, a state of the pre-synaptic neuron, or a state of the post-synaptic neuron.

9. The method of claim 1, wherein:
a chance of the one or more failures or successful transmissions of events via the synaptic connection does not affect an amount of an input to the post-synaptic neuron, if a transmission of an event via the synaptic connection is success, and
the amount of the input is zero, if the transmission of the event via the synaptic connection fails.

10. The method of claim 1, wherein a probability of the one or more failures is a function of a synaptic connectivity in the neural network.

11. An apparatus for neural learning in a neural network, comprising:
a first circuit configured to determine a synaptic weight for a synaptic connection between a pre-synaptic neuron and a post-synaptic neuron;
a second circuit configured to determine one or more failures of the synaptic connection based on a set of characteristics of the synaptic connection, wherein the set of characteristics comprises the synaptic weight;
a third circuit configured to omit the one or more failures from computation of a neuronal behavior of the post-synaptic neuron; and
a fourth circuit configured to include one or more effects of the one or more failures in learning of the synaptic weight.

12. The apparatus of claim 11, wherein the second circuit is also configured to determine the one or more failures that are probabilistic.

13. The apparatus of claim 12, wherein a probability of each of the one or more failures depends on one or more synaptic characteristics from the set.

14. The apparatus of claim 11, wherein the first circuit is also configured to determine the synaptic weight according to a learning rule.

15. The apparatus of claim 11, wherein the learning of the synaptic weight is executed at a different time than updating of the synaptic weight would have been executed had the synaptic connection not failed.

16. The apparatus of claim 11, wherein the fourth circuit is also configured to:
adjust changes of the synaptic weight for successful transmissions of events to the post-synaptic neuron via the synaptic connection depending on a probability of the one or more failures.

17. The apparatus of claim 11, wherein the fourth circuit is also configured to:
determine changes of the synaptic weight for the one or more failures and for one or more successful transmissions of events to the post-synaptic neuron via the synaptic connection.

18. The apparatus of claim 11, wherein the set of characteristics of the synaptic connection further comprises at least one of: a delay of the synaptic connection, an age of the synaptic connection, location of the synaptic connection, a size of the synaptic connection, a state of the synaptic connection, a time period since last activation of the synaptic connection, a time period since last successful activation or failed activation of the synaptic connection, a state of the pre-synaptic neuron, or a state of the post-synaptic neuron.

19. The apparatus of claim 11, wherein:
a chance of the one or more failures or successful transmissions of events via the synaptic connection does not affect an amount of an input to the post-synaptic neuron, if a transmission of an event via the synaptic connection is success, and
the amount of the input is zero, if the transmission of the event via the synaptic connection fails.

20. The apparatus of claim 11, wherein a probability of the one or more failures is a function of a synaptic connectivity in the neural network.

21. An apparatus for neural learning in a neural network, comprising:
means for determining a synaptic weight for a synaptic connection between a pre-synaptic neuron and a post-synaptic neuron;
means for determining one or more failures of the synaptic connection based on a set of characteristics of the synaptic connection, wherein the set of characteristics comprises the synaptic weight;
means for omitting the one or more failures from computation of a neuronal behavior of the post-synaptic neuron; and
means for including one or more effects of the one or more failures in learning of the synaptic weight.

22. The apparatus of claim 21, further comprising:
means for determining the one or more failures that are probabilistic.

23. The apparatus of claim 22, wherein a probability of each of the one or more failures depends on one or more synaptic characteristics from the set.

24. The apparatus of claim 21, further comprising:
means for determining the synaptic weight according to a learning rule.

25. The apparatus of claim 21, wherein the learning of the synaptic weight is executed at a different time than updating of the synaptic weight would have been executed had the synaptic connection not failed.

26. The apparatus of claim 21, further comprising:
means for adjusting changes of the synaptic weight for successful transmissions of events to the post-synaptic neuron via the synaptic connection depending on a probability of the one or more failures.

27. The apparatus of claim 21, further comprising:
means for determining changes of the synaptic weight for the one or more failures and for one or more successful transmissions of events to the post-synaptic neuron via the synaptic connection.

28. The apparatus of claim 21, wherein the set of characteristics of the synaptic connection further comprises at least one of: a delay of the synaptic connection, an age of the synaptic connection, location of the synaptic connection, a size of the synaptic connection, a state of the synaptic connection, a time period since last activation of the synaptic connection, a time period since last successful activation or failed activation of the synaptic connection, a state of the pre-synaptic neuron, or a state of the post-synaptic neuron.

29. The apparatus of claim 21, wherein:
a chance of the one or more failures or successful transmissions of events via the synaptic connection does not affect an amount of an input to the post-synaptic neuron, if a transmission of an event via the synaptic connection is success, and
the amount of the input is zero, if the transmission of the event via the synaptic connection fails.

30. The apparatus of claim 21, wherein a probability of the one or more failures is a function of a synaptic connectivity in the neural network.

31. A computer program product for neural learning in a neural network, comprising a non-transitory computer-readable medium comprising code for:

determining a synaptic weight for a synaptic connection between a pre-synaptic neuron and a post-synaptic neuron;

determining one or more failures of the synaptic connection based on a set of characteristics of the synaptic connection, wherein the set of characteristics comprises the synaptic weight;

omitting the one or more failures from computation of a neuronal behavior of the post-synaptic neuron; and including one or more effects of the one or more failures in learning of the synaptic weight.

32. The computer program product of claim 31, wherein the computer-readable medium further comprising code for determining the one or more failures that are probabilistic.

33. The computer program product of claim 32, wherein a probability of each of the one or more failures depends on one or more synaptic characteristics from the set.

34. The computer program product of claim 31, wherein the computer-readable medium further comprising code for determining the synaptic weight according to a learning rule.

35. The computer program product of claim 31, wherein the learning of the synaptic weight is executed at a different time than updating of the synaptic weight would have been executed had the synaptic connection not failed.

36. The computer program product of claim 31, wherein the computer-readable medium further comprising code for:

adjusting changes of the synaptic weight for successful transmissions of events to the post-synaptic neuron via the synaptic connection depending on a probability of the one or more failures.

37. The computer program product of claim 31, wherein the computer-readable medium further comprising code for:

determining changes of the synaptic weight for the one or more failures and for one or more successful transmissions of events to the post-synaptic neuron via the synaptic connection.

38. The computer program product of claim 31, wherein the set of characteristics of the synaptic connection further comprises at least one of: a delay of the synaptic connection, an age of the synaptic connection, location of the synaptic connection, a size of the synaptic connection, a state of the synaptic connection, a time period since last activation of the synaptic connection, a time period since last successful activation or failed activation of the synaptic connection, a state of the pre-synaptic neuron, or a state of the post-synaptic neuron.

39. The computer program product of claim 31, wherein:

a chance of the one or more failures or successful transmissions of events via the synaptic connection does not affect an amount of an input to the post-synaptic neuron, if a transmission of an event via the synaptic connection is success, and the amount of the input is zero, if the transmission of the event via the synaptic connection fails.

40. The computer program product of claim 31, wherein a probability of the one or more failures is a function of a synaptic connectivity in the neural network.

* * * * *